United States Patent [19]

Kuppenheimer, Jr.

[11] 4,402,602
[45] Sep. 6, 1983

[54] KNIFE EDGE SYSTEM

[75] Inventor: John D. Kuppenheimer, Jr., Tewksbury, Mass.

[73] Assignee: Sanders Associates, Inc., Nashua, N.H.

[21] Appl. No.: 276,219

[22] Filed: Jun. 22, 1981

[51] Int. Cl.³ .............................................. G01B 9/00
[52] U.S. Cl. .................................................. 356/124
[58] Field of Search ....................... 356/124, 125, 126

[56] References Cited
U.S. PATENT DOCUMENTS 3,418,477 12/1968 Knutrud et al. ..................... 356/124
3,431,352 3/1969 Philbert .............................. 356/124
3,736,060 5/1973 Mayo .................................. 356/124

*Primary Examiner*—Bruce Y. Arnold
*Attorney, Agent, or Firm*—Louis Etlinger; Richard I. Seligman

[57] ABSTRACT

An improved knife edge system which enables testing of even high numerical aperture optics is achieved by using a microscope objective to gather the light from a small pinhole and fill a large optic under test, and in conjunction with a special eye piece permits viewing of the surface of the optic under test.

5 Claims, 4 Drawing Figures

FIG. I (PRIOR ART)

KNIFE EDGE SYSTEM

BACKGROUND OF THE INVENTION

This invention relates to optical systems and, more particularly, to the testing of the quality thereof.

The traditional method of evaluating the quality of an optical system is to perform a knife edge test. This test is used for any optical system which forms an image in at least one plane. Fundamentally, a knife edge is caused to traverse in the focused plane of light from an optical system under test. If the system does not have imperfections, an observer will see a uniform decrease in illumination as the knife edge moves through the plane. If the optical system under test has imperfections, these will show up as light and dark zones.

Such knife edge systems are not only useful in testing the quality of optical systems but also useful for making them. For example, parabolic optical surfaces are typically made by opticians by starting with a spherical surface and figuring the sphere into a parabola using the knife edge test. The test involves the use of an auxiliary optic (large flat, second large parabola, etc.). A knife edge illuminator is then placed at the focal point. The patterns which are visible show up imperfections, that is, where material need be removed to obtain the parabolic surface.

The knife edge tests are not only useful for testing the quality of optical surfaces such as mirrors but for any optical system. For example, lens systems (designed with one infinite focus) may be tested by using an optical flat to return the light therethrough with the knife edge at the rear focal point.

A typical knife edge test system like that currently being used in the optics industry is illustrated in FIG. 1. The system is shown (for simplicity) testing a single spherical optical surface 10 (in reflection). Light from a source 12 such as light bulb, is collected by a lens 14 and focused on a pinhole 16 which is mounted on the side of a cube splitter, 15. The light diverges from pinhole 16 and is reflected toward the tested optic 10 by partially reflecting surface 20. A series of three mutually orthogonal adjustments (represented in FIG. 1 by the single adjustment 19) allows the positioning of the system so that the apparent optical position of the source (pinhole 16) is at the center of curvature (of focal point in the case of an optic with an infinite conjugate). At this point the optical energy is returned back upon itself and forms an image of pinhole 16 at point 30 on the back of the splitter cube 15. On the back of cube 15 is knife edge 22 whose edge is just outside point 30. At this stage all the light passes by knife edge 22 and into the observers eye, 24. The observer slowly turns screw 19 pushing knife edge 22 through the focal plane. If the optic is perfect the surface 10 appears to go dim uniformly. If surface 10 is not perfect various zones will appear lighter or darker (lighter one side darker on the other), and based on these light and dark zones, material can be removed from surface 10 to drive it toward perfection.

If the optic is imperfectly formed or the knife edge is out of the focal plane, or the system is maladjusted, the surface of the optic will appear with some regions bright and some dark and the observer can tell what is imperfect in the optic or the alignment.

This system works well for optics of moderate aperture (e.g. F/3=0.164 N.A.) and can be used to about f/2 (N.A.=0.243) with difficulty. For optical systems of larger numerical aperture this system is unsatisfactory because it is difficult to fill the entire mirror 10 with light using lenses of reasonable size. Additionally, when testing large numerical aperture systems in this manner, the human eye (f/3) isn't sufficiently fast to accept all of the rays from the mirror 10 under test, particularly those rays from the edges of the mirror and therefore, one cannot test the entire mirror.

For testing mirrors with a low f-number or high numerical aperture other means are provided. One method of avoiding the problem is to provide an auxiliary optical element which is slow intermediate the knife edge and element under test. This works if the element under test is relatively small, however, for large systems the cost of generating the auxiliary optic may be prohibitive.

A second solution to the problem is to employ a laser unequal path interferometer. This works quite well if the system under test is already of very high quality (not more than a few waves from diffraction limited.). If the system is not of this quality, no information can be obtained. This solution is also very expensive because of the alignment requirements internal to the instrument.

Accordingly, it is an object of this invention to provide an improved knife edge system.

It is another object of this invention to provide a system for testing a high numerical aperture optical elements.

SUMMARY OF THE INVENTION

Briefly, an improved knife edge system is provided by employing an auxiliary lens such as a microscope objective to permit the testing of high numerical aperture optics. By employing an auxiliary lens which in one direction substantially matches the f-number of the optic under test, the user can use knife edge systems to test optics having high numerical apertures (low f-numbers) since the f-number in the front focal plane of the auxiliary lens will also be low and, therefore, will permit filling the large object under test with light. Since the back f-number of the auxiliary lens will be large, the lens itself will be easily filled with light from even a small pinhole outputting a very narrow bundle of light.

The knife edge system additionally includes a special eye piece which, in conjunction with the auxiliary lens, forms a telescope focused at the surface of the optic when the image is not cut off by the knife edge.

In a second embodiment of the invention a further lens is employed to relay the back focal plane of the auxiliary lens to a position near the eye piece which allows use of a smaller focal length eye piece and, hence, results in a larger image to the observer.

BRIEF DESCRIPTION OF THE DRAWINGS

The above-mentioned and other features and objects of this invention will become more apparent by reference to the following description taken in conjunction with the accompanying drawings, in which.

DESCRIPTION OF PREFERRED EMBODIMENTS

Figure 1:
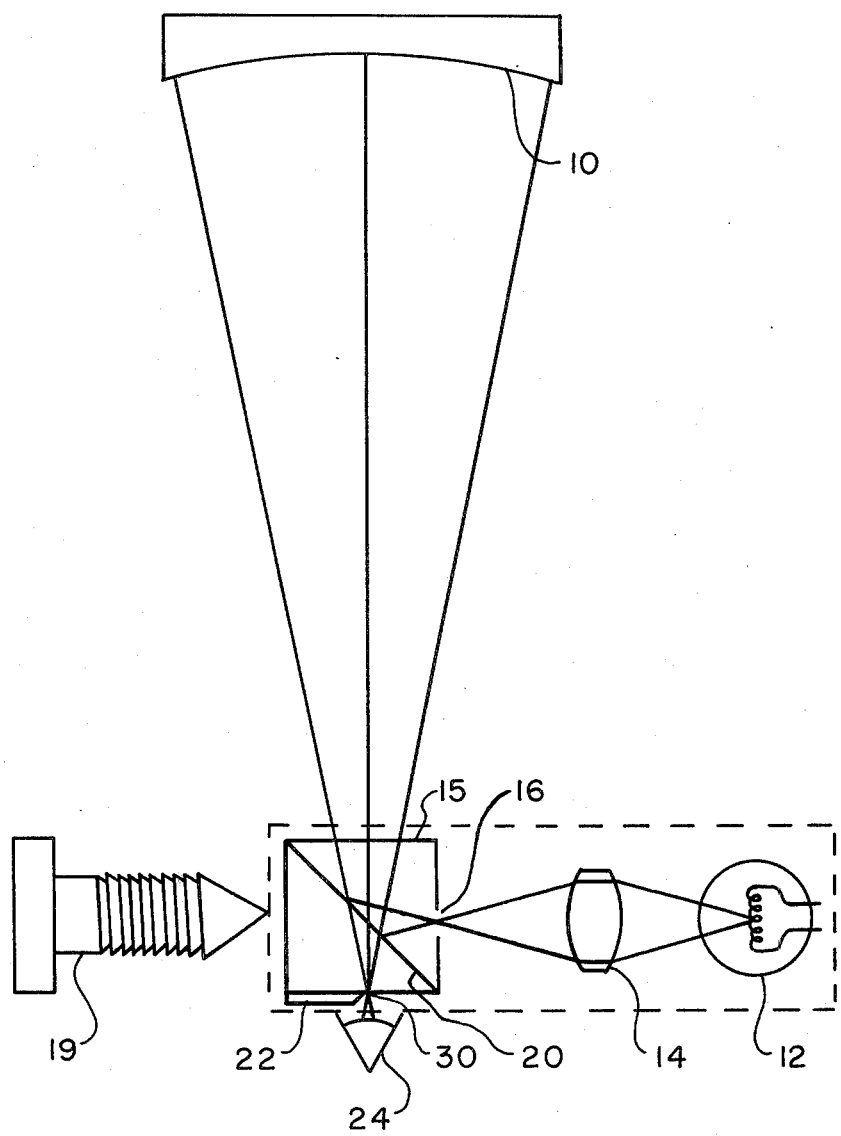
FIG. 1 is an illustration of a prior art knife edge system.
Figure 2:
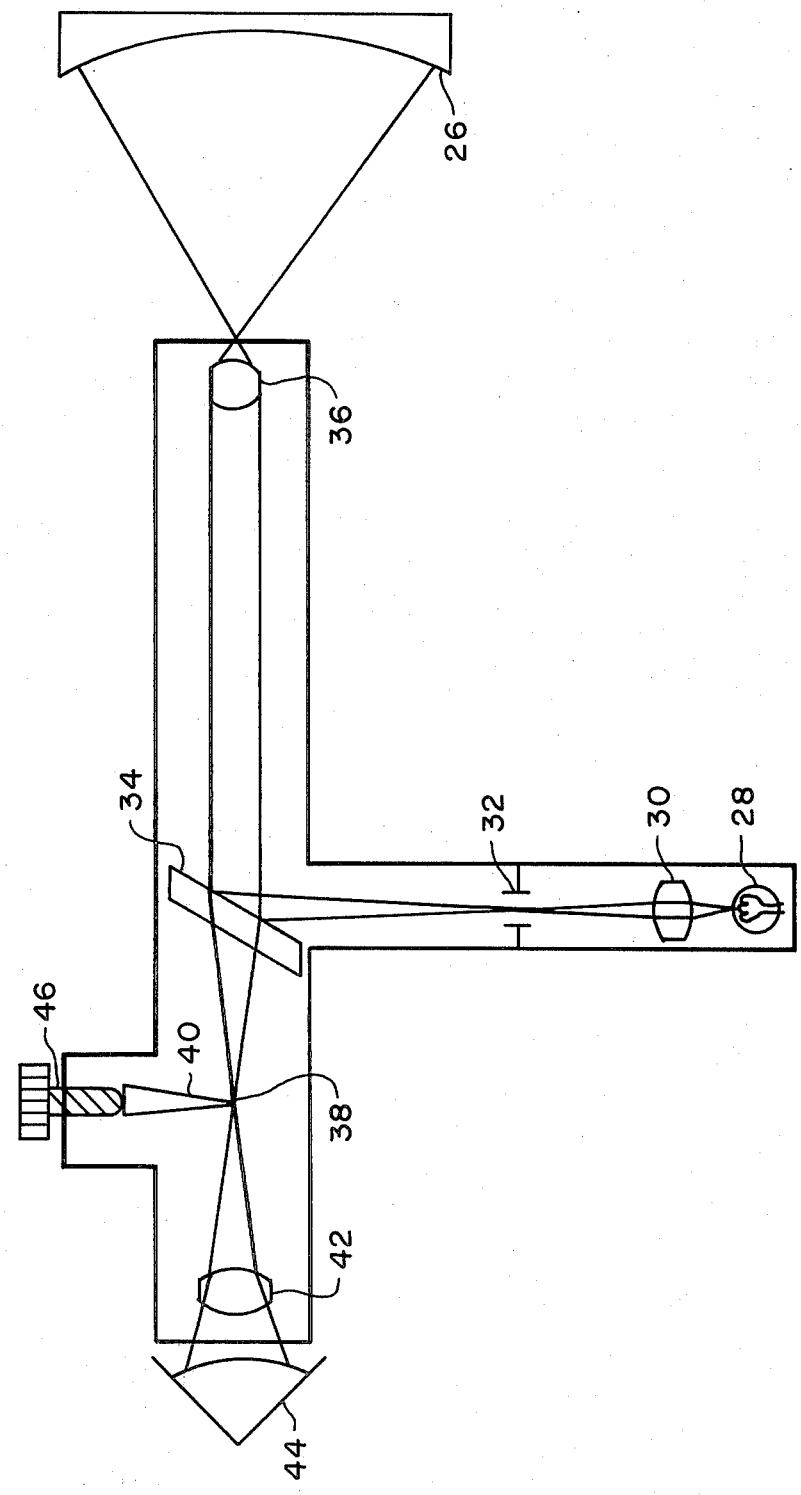
FIG. 2 is an illustration of an embodiment of an improved knife edge system.

Referring now to FIG. 2 of the drawings, there is illustrated thereby an embodiment of a knife edge system suitable for testing optics having a high numerical aperture. In this system the optic to be tested, mirror 26, is filled with light from a light source 28. The light is applied to mirror 26 from light source 28 via a lens 30, a pinhole 32, a beam splitter 34 and a lens 36. The return from mirror 26 is focused at a point 38 by lens 36 through beam splitter 34. A knife edge 40 is positioned at the focal point 38. An eye piece 42 is provided so that an observer 44 can view the image from the mirror 26 as the knife edge passes through the focal point 38. As in the prior art system imperfections will show up as dark and light zones. A filar (micrometric) head 46 is preferably employed to move the knife edge. While a light source 28 is illustrated, a fiber optic bundle is preferred to reduce heat near the optics.

One of the important features of this invention over the prior art system is the use of the auxiliary lens 36. Lens 38 is preferably a microscope objective lens since these lenses are readily available at reasonable cost and have the necessary characteristics for lens 36. The f-number in the front focal plane is very small and, therefore, applying the light therefrom to the mirror can fill it, even for relatively large mirrors. Furthermore, the back f-number is large and, therefore, the lens is easily filled from the pinhole with a relatively narrow bundle of light. The laws of physics require that, as the mirror gets faster, the pinhole must be made smaller. This means for very fast optics an extremely small pinhole is usually necessary. The present system can use a pinhole which is larger by the power of the microscope objective 36 than could ordinarily be used since its size will be reduced by this power in the front focal plane of lens 36. This is an advantage since very tiny pinholes are hard to obtain and harder still to illuminate properly. While a microscope objective is suggested for lens 36, other lenses may be employed as long as such lenses form good high quality images and substantially match the f-number of the system under test. To get the entire object under test filled with the light, the lens 36 must have a f-number equal to or less than the f-number of the object under test and not too much less or else light will be wasted. By substituting a standard eye piece for the long focal length eye piece 44, the observer can examine the image itself which is sometimes useful.

Figure 3:
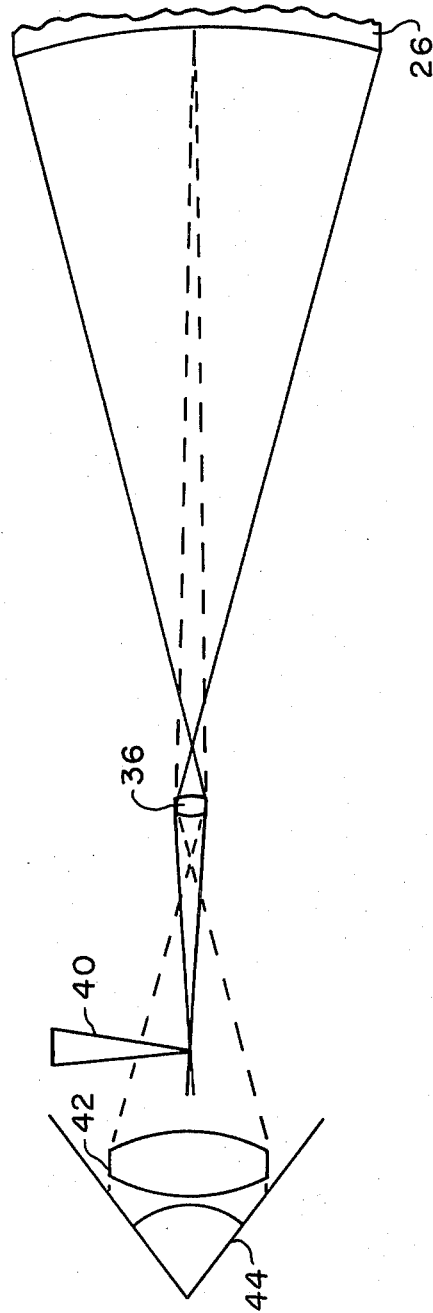
FIG. 3 is a schematic illustration illustrating operation of the embodiment of FIG. 2.

FIG. 3 is a simplified schematic of the embodiment of FIG. 2 showing with clarity what is occurring in FIG. 2. The solid rays illustrate the important rays for filling the optic 26 and cutting off with the knife edge. The dotted rays show the more important rays which illustrates that the optic 26 is in focus to the observer 44.

The following is a listing of the recommended power of microscope objective 36 to be used to test an optical system of particular numerical aperture and f-number.

| Power of Microscope Objective | Approximate Numerical Aperture | f-number |
|---|---|---|
| 2.5 X | .08 | 6.25 |
| 4 X | .10 | 5.00 |
| 6 X | .17 | 2.94 |
| 10 X | .25 | 2.00 |
| 10 X | .40 | 1.25 |
| 40 X | .65 | 0.77 |
| 60 X | .85 | 0.59 |
| 80 X | .90 | 0.56 |

It can be seen from the listing that by simply changing objectives a user can conveniently fill any fast (and some not so fast) optics.

Because the apparatus of FIG. 2 is small and light weight, it can be mounted on a micrometric three-axis stage which allows very convenient positional adjustment and further permits easy interchanges of microscope objectives and eye pieces.

Figure 4:
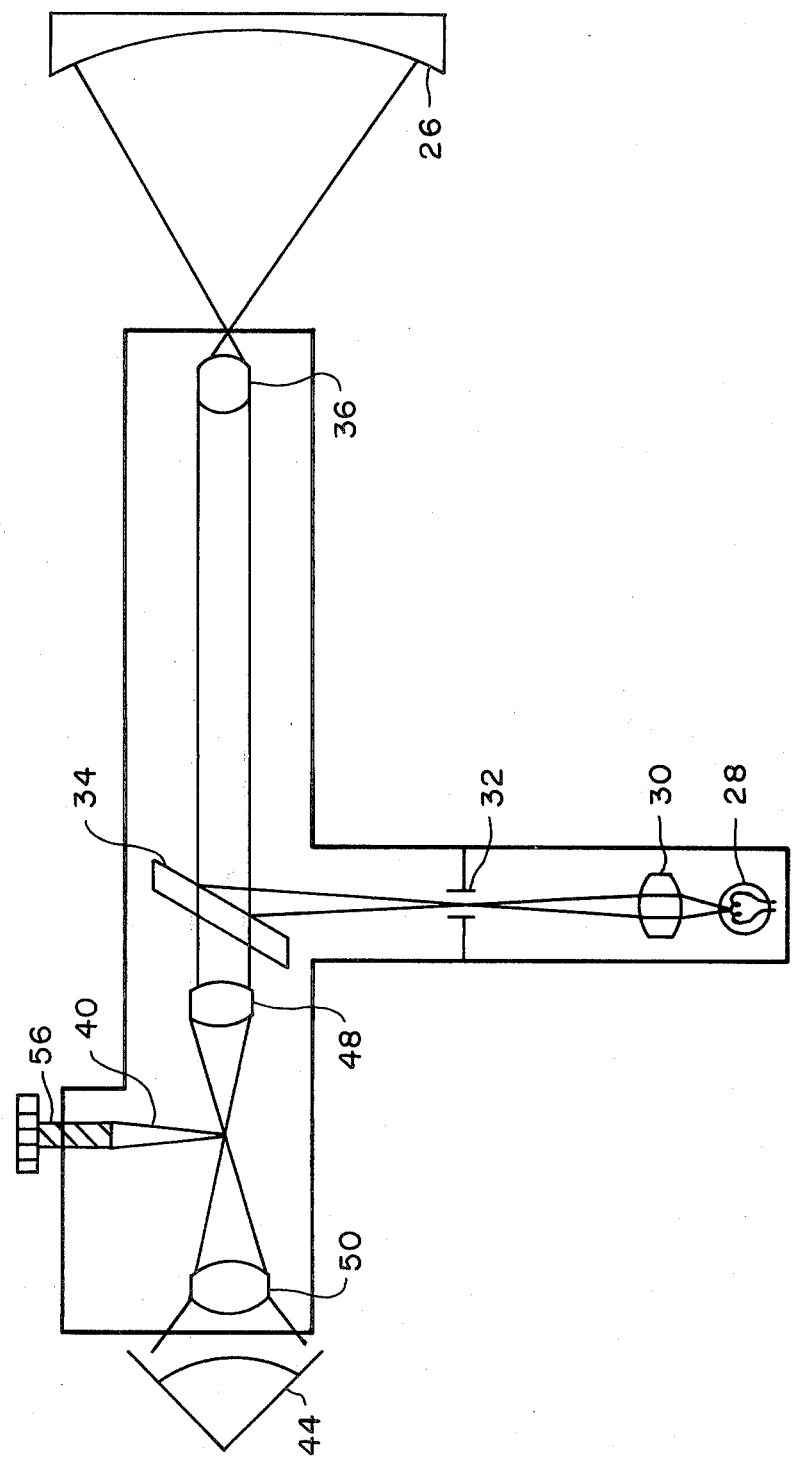
FIG. 4 is an illustration of a second embodiment of an improved knife edge system.

The one disadvantage to this system is that eye piece 42 must have a relatively long focal length in order to image the mirror 26. This results in relatively large demagnification of the mirror to the observer making it relatively difficult to easily locate the bad regions thereof. Of course, some demagnification is required to order to image the mirror onto the eye of the observer. This disadvantage is overcome by the embodiment of FIG. 4.

This embodiment is like that of FIG. 2 with the exception of an additional lens 48 and a different eye piece 50. The lens 48 is used to relay the back focal plane from lens 36 to a position near the eye piece 50 and behind the knife edge. This permits the use of a much shorter focal length eye piece 50 which results in a substantially larger image at the eye of the observer. Lens 48 is preferably a low power (2X) microscope objective.

While I have described above the principles of my invention in connection with specific apparatus, it is to be clearly understood that this description is made only by way of example and not as a limitation of the scope of my invention as set forth in the accompanying claims.

I claim:

1. A knife edge system for testing optics, comprising:
 a source of light;
 means for applying said light to an optic under test, said means for applying including a lens having an f-number which is substantially equal to or less than the f-number of the optic under test;
 said lens also focusing light returned from the optic under test;
 a knife edge;
 means for traversing the focused image with the knife edge; and
 an eye piece for viewing the surface of the object under test.

2. The knife edge system of claim 1, wherein said lens is a microscope objective.

3. The knife edge system of claim 1, wherein said eye piece and said lens form a telescope.

4. The knife edge system of claim 1, wherein said eye piece has a sufficiently long focal length so that its front focal plane will substantially coincide with the rear focal plane of said lens.

5. The knife edge system of claim 1, further including a second lens for relaying the back focal plane of the lens nearer to the eye piece, thus permitting use of a relatively short focal length eye piece.

* * * * *